US010122205B2

(12) United States Patent
Matsumura et al.

(10) Patent No.: US 10,122,205 B2
(45) Date of Patent: Nov. 6, 2018

(54) SYSTEMS AND METHODS FOR ADAPTIVE CHARGE TERMINATION

(71) Applicant: INTEL CORPORATION, Santa Clara, CA (US)

(72) Inventors: Naoki Matsumura, San Jose, CA (US); Andrew W. Keates, Los Gatos, CA (US); Krishnan Ravichandran, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 380 days.

(21) Appl. No.: 14/976,210

(22) Filed: Dec. 21, 2015

(65) Prior Publication Data
US 2017/0179733 A1    Jun. 22, 2017

(51) Int. Cl.
  *H02J 7/00*    (2006.01)
  *H02J 7/35*    (2006.01)

(52) U.S. Cl.
  CPC .............. *H02J 7/35* (2013.01); *H02J 7/008* (2013.01); *H02J 7/0047* (2013.01); *H02J 7/0063* (2013.01); *H02J 2007/005* (2013.01); *H02J 2007/0067* (2013.01)

(58) Field of Classification Search
  CPC ....................................................... H02J 7/35
  USPC ....................................................... 320/101
  See application file for complete search history.

(56) References Cited

U.S. PATENT DOCUMENTS

| 6,037,750 | A  | * | 3/2000 | Von Novak | ............ | H02J 7/0011 |
|           |    |   |        |           |              | 320/128 |
| 7,199,556 | B1 | * | 4/2007 | Benckenstein, Jr. | . | H02J 7/0016 |
|           |    |   |        |           |              | 320/112 |
| 8,237,408 | B2 | * | 8/2012 | Carkner | ................ | H02J 7/0091 |
|           |    |   |        |           |              | 320/131 |
| 2012/0019189 | A1 | * | 1/2012 | Kim | ....................... | H01M 10/44 |
|           |    |   |        |           |              | 320/101 |

FOREIGN PATENT DOCUMENTS

| JP | 2010139396 A | 6/2010 |
| JP | 2011092002 A | 5/2011 |
| JP | 2014236541 A | 12/2014 |
| WO | 2014196506 A1 | 12/2014 |

OTHER PUBLICATIONS

PCT/US2016/059410, International Search Report and Written Opinion, dated Feb. 10, 2017, 13 pages.

* cited by examiner

*Primary Examiner* — Yalkew Fantu
(74) *Attorney, Agent, or Firm* — Stoel Rives LLP

(57) ABSTRACT

A system for increasing the life of a battery cell by limiting the charging of the battery to less than full charge in response to a predicted electricity draw of a connected device being less than the full capacity of the battery before a predicted recharge will occur. The current draw of the connected device may be affected by the amount of time before a next recharge and environmental factors. The system may further comprise one or more sensors to gather data pertaining to environmental conditions that may be used in the calculation of a charge termination value. The charge termination value is an amount of charge to power the device for a duration of time at least until a predicted recharge begins.

25 Claims, 6 Drawing Sheets

SYSTEMS AND METHODS FOR ADAPTIVE CHARGE TERMINATION

TECHNICAL FIELD

This disclosure relates to methods and systems for regulating a charging process for batteries, and more particularly to terminating a charging process for a rechargeable battery.

BACKGROUND

Many types of rechargeable batteries degrade over the rechargeable batteries' lifetimes. One factor that contributes to the degradation of a battery is maintaining an amount of charge that is a high percentage of the battery's total charge capacity. Many electronic devices, including sensor nodes, solar powered roadway signs, and remote solar powered lighting systems depend on batteries with long life cycles to reduce the need to maintain the device and replace batteries.

BRIEF DESCRIPTION OF THE DRAWINGS

Arrangements and embodiments may be described in detail with reference to the following drawings, in which like reference numerals refer to like elements, and wherein.

DETAILED DESCRIPTION OF EMBODIMENTS

Figure 1:
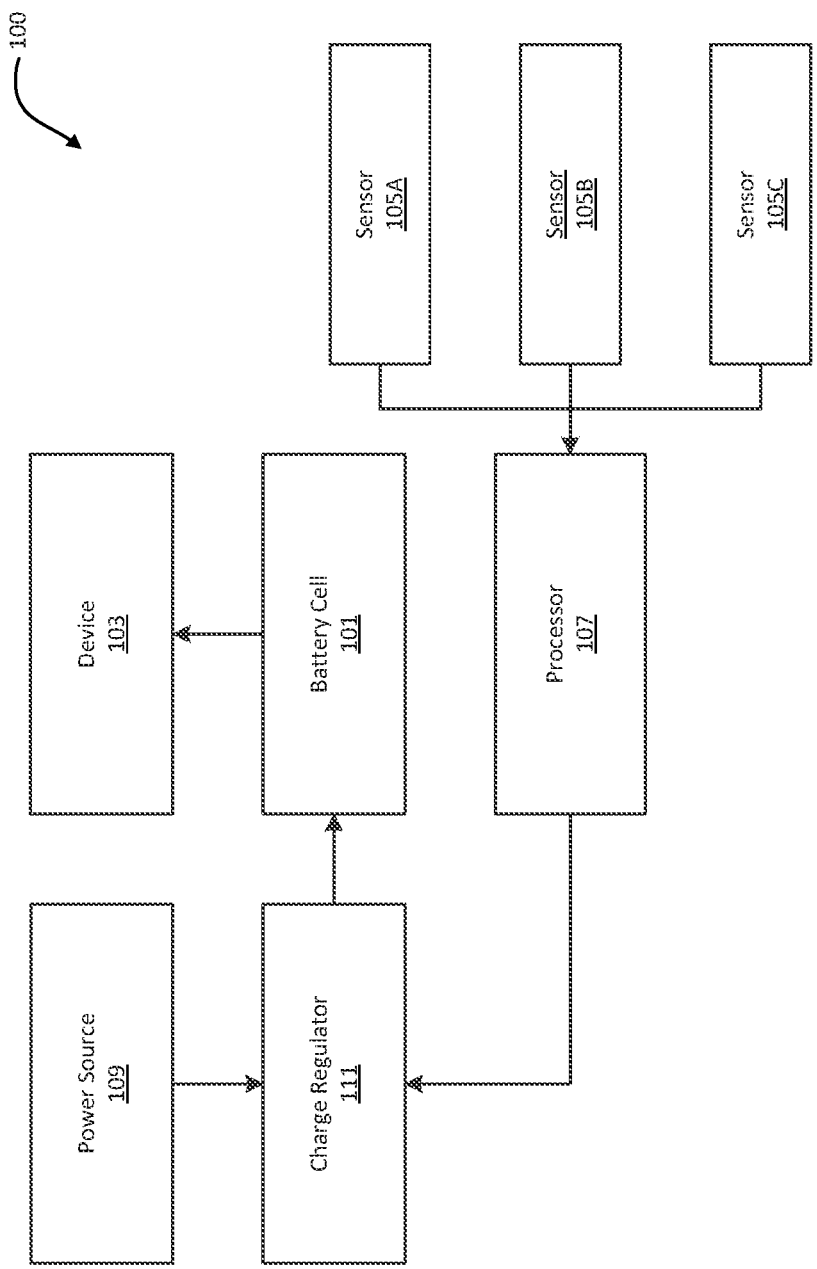
FIG. 1 is a system for terminating the charging of a battery cell at a charge termination value that is calculated by accounting for environmental conditions according to one embodiment.

Embodiments and arrangements disclosed herein describe a system including a rechargeable energy storage device, which may be referred to herein as a "battery cell" or "battery." The battery may be electrically coupled to a load or "device" in a manner that permits energy flow from the battery to the device. In certain embodiments, the battery is connected to a power source for charging. In some of these embodiments, a charge regulator is able to terminate, or reduce the rate of, energy flow from the power source to the battery ("charging"). In further embodiments, a processor sends a command to the charge regulator to terminate, or reduce the rate of, charging. In some of these embodiments, a rate of discharging is measured or calculated based on an amount of electricity delivered from the battery to the device and the rate of charging may be reduced to a rate that maintains a near-constant level of charge in the battery cell. In some embodiments, the processor accesses data pertaining to one or more environmental conditions ("environmental data") and calculates an amount of charge to power the device for a duration of time at least until a predicted recharge begins ("charge termination value"). In some of these embodiments, the environmental data is gathered by sensors and stored in a data store ("memory"). Some embodiments may also comprise an alarm to communicate that the battery cell is at an insufficient charge level to continue providing electricity to the device until a predicted recharge begins. In other embodiments, an alarm may communicate that, due to one or more factors such as degradation and environmental factors, the battery is no longer capable of storing energy required to reach the charge termination value for one or more predicted durations of time for which the battery will be without charging.

Many devices would benefit from extending the life of batteries to reduce maintenance of the device and the cost of replacing a battery. Particularly, devices that are located in remote areas would benefit from a reduction of required maintenance because the time and effort to access the devices may be costly. Additionally, many users of sensor nodes and other similar devices have a plurality of devices, the maintenance of which may be overly burdensome.

For simplicity and clarity of illustration, the drawing figures illustrate the general relationship of systems and methods, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. Similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," and "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

FIG. 1 illustrates a system 100 for terminating the charging of a battery cell 101 at a charge termination value that is calculated by accounting for environmental conditions comprising a device 103; sensors 105A, 105B, 105C; a processor 107; a power source 109; and a charge regulator 111. In some embodiments, the battery cell 101 is prone to degradation over time and use.

In some embodiments, the battery cell 101 comprises a rechargeable battery comprising one of a lithium-ion battery, a lithium-ion polymer battery, a lead-acid battery, a nickel-cadmium battery, a nickel-metal hydride battery, and a silver-zinc battery. However, the system 100 is designed to work with many alternative rechargeable batteries. In some embodiments, the battery cell 101 has an initial charge capacity of less than 750 mAh, or more specifically, between 200 mAh and 350 mAh, between 350 mAh and 550 mAh, between 550 mAh and 750 mAh, or between 750 mAh and 1 Ah. In other embodiments, the battery cell 101 has an initial charge capacity of 1 Ah and 10 Ah. In further embodiments, the battery cell 101 has an initial charge capacity of greater than 10 Ah.

In the illustrated embodiment, the sensors 105A, 105B, 105C may gather data pertaining to one or more environmental conditions including temperature, sunlight intensity, weather forecast, humidity, night length, pressure, and precipitation. In some embodiments, one or more of the sensors 105A, 105b, 105C are devices that directly measure environmental conditions. In some embodiments, one or more of the sensors 105A, 105B, 105C may be wireless communication devices that communicate with a remote data source such as the internet of things or a centralized data center. In other embodiments, the sensors 105A, 105B, 105C may be remote from the processor 107 and may communicate the gathered data via wireless communication.

In other embodiments, any number of sensors may gather data pertaining to one or more environmental conditions. For example, a system may have only one sensor that gathers environmental data by communicating with a remote data source. In other embodiments, a system may have only one sensor that gathers data pertaining to one environmental condition. In some embodiments, a system may have only one sensor that gathers data pertaining to a plurality of environmental conditions.

In the illustrated embodiment, the processor 107 receives the environmental data and processes the environmental data to calculate a charge termination value. The charge termination value is an amount of charge to power the device for a duration of time at least until a predicted recharge of the battery cell begins. In some embodiments, the charge termination value is calculated as the minimum amount of charge necessary to power the device until a predicted recharge will begin ("minimum charge"). In other embodiments, the charge termination value is calculated as the minimum charge with a specified amount of reserve charge added. For example, if the minimum charge is 150 mAh, the charge termination value may be 200 mAh to provide a reserve of 50 mAh. In some embodiments, the reserve is calculated as a percentage of the minimum charge. In other embodiments, the reserve is calculated as at least the amount of charge to power the device until a second predicted recharge will begin. In further embodiments, the reserve is calculated as at least the amount of charge to power the device until a seventh predicted recharge will begin.

The charge termination value may account for environmental conditions. For instance, in high temperatures, the electrical resistance in metal increases, which would increase the amount of energy needed to power the device, increasing the minimum charge and, in turn, the charge termination value. Similarly, humidity, pressure, and precipitation may affect the efficiency of the device and cause an increase, or decrease, in the minimum charge and the charge termination value. Environmental conditions such as sunlight intensity, night length, and precipitation may affect the power source's ability to provide energy to charge the battery and may also affect the minimum charge and the charge termination value. Data relating to a weather forecast may be used to predict the environmental conditions that may affect the minimum charge and thus may be factored into the calculation of the charge termination value.

In some embodiments, the charge termination value is calculated as a percentage of battery charge capacity using the equation: $H_n/H_0 \times Y \times 1/Z \times 100\%$, wherein $H_n$ is the number of hours in the predicted duration of time between recharges following the current day at the power supply's location, wherein $H_0$ is the number of hours in the longest predicted duration of time between recharges, wherein Y is a coefficient based on environmental conditions such that Y is greater than 1 when environmental conditions cause one or more of additional energy consumption by the device than under ideal environmental conditions and decreased energy provided to the battery cell by the power supply, and wherein Z is a coefficient based on battery cell degradation such that when the battery cell has decreased in charge capacity from degradation. Z represents the fraction of a current full battery cell charge capacity divided by an original battery cell charge capacity. In some embodiments, the battery capacity may decrease at colder temperatures, so Y accounts for one or more of temperature forecast, temperature data, and predicted temperature based on environmental data stored in the system 100. In some embodiments, one or more of $H_n$, $H_0$, Y, and Z are factors of the calculation of the charge termination value.

In some embodiments, the charge termination value is calculated similar to the methods described above, but as a total amount of charge stored in the battery cell 101, rather than a percentage of the battery cell 101 charge capacity.

In some embodiments, the processor 107 uses environmental data to determine one or more of the length of a night and the length of a day. In some of these embodiments, the lengths of a plurality of nights are stored in a data store. In still further embodiments, the processor 107 predicts the length of a present or future night from a model based upon the lengths of the plurality of nights stored in the data store.

In some embodiments, the power source 109 generates electricity to provide to the battery cell 101. In some of these embodiments, the environmental conditions affect electricity generation of the power source 109. For example, in some embodiments, the power source 109 generates electricity from one or more of light, heat, and wind. In some embodiments, the power source 109 provides electricity in the form of an alternating current. In other embodiments, the power source 109 provides electricity in the form of a direct current.

In the illustrated embodiment, the charge regulator 111 is positioned along a circuit between the power source 109 and the battery cell 101. In some embodiments, the charge regulator 111 is configured to prevent, or reduce, charging of the battery cell 101 when the charge of the battery cell 101 reaches or exceeds the charge termination value. In some of these embodiments, the charge regulator 111 receives a command from the processor 107 to prevent or reduce charging of the battery cell 101. In other embodiments, the charge regulator 111 is configured to reduce the amount of power (energy/time) provided to the battery cell 101 to an amount determined to be a current power output from the battery cell 101, thus maintaining the charge level of the battery at approximately the charge termination value.

In some embodiments, the charge regulator 111 comprises a coulomb counting module for monitoring energy into and/or out of the battery cell 101. In some embodiments, the charge regulator 111 is remote from the processor 107 and receives communication from the processor 107 via a wireless communication module. In some embodiments, the charge regulator 111 comprises a sensor to detect energy output data from the power source 109. In some of these embodiments, the charge regulator 111 comprises a second processor to monitor the energy output data to determine that a recharge period has terminated or that a recharge period has initiated. The charge regulator 111 may further comprise a clock that may determine one or more of the length of time between recharges and the length of a recharge period. The charge regulator 111 may further comprise memory for storing one or more of energy output data, length of time between charges, and length of a recharge period. In embodiments in which the charge regulator 111 comprises a second processor and memory, the charge regulator 111 may process data over a period of time to predict one or more of the length of time between recharges and the length of a recharge period for a present or future day.

In other embodiments wherein the charge regulator 111 comprises a sensor to detect energy output data from the power source 109, the energy output data is delivered to the processor 107 to be processed or stored in an accessible data store for later processing. Similar to the embodiments above, the processor 107 may process data over a period of time to predict one or more of the length of time between recharges and the length of a recharge period for a present or future day.

In some embodiments of a system for terminating the charging of the battery cell 101 at a charge termination value that is calculated by accounting for environmental conditions, a single device may comprise one or more of the elements described herein. In some of these embodiments, the power source 109 may be external to the device comprising one or more of the elements described herein. In some embodiments, the power source 109 comprises one or more of the sensors 105A, 1056, 105C. In some embodiments, the system 100 comprises multiple data stores.

In some embodiments, the power source 109 comprises a sensor for detecting rates of electricity generation that can be used to determine one or more of a beginning and end of a recharge period. In some of these embodiments, information from the power source sensor can be received by one of the processor 107 and the charge regulator 111 to process the information to predict one or more of the beginning and end of a recharge period. In further embodiments, one or more of the power source 109, the charge regulator 111, and the processor 107 comprise a timing device for measuring the amount of time that an environmental condition exists.

Figure 2:
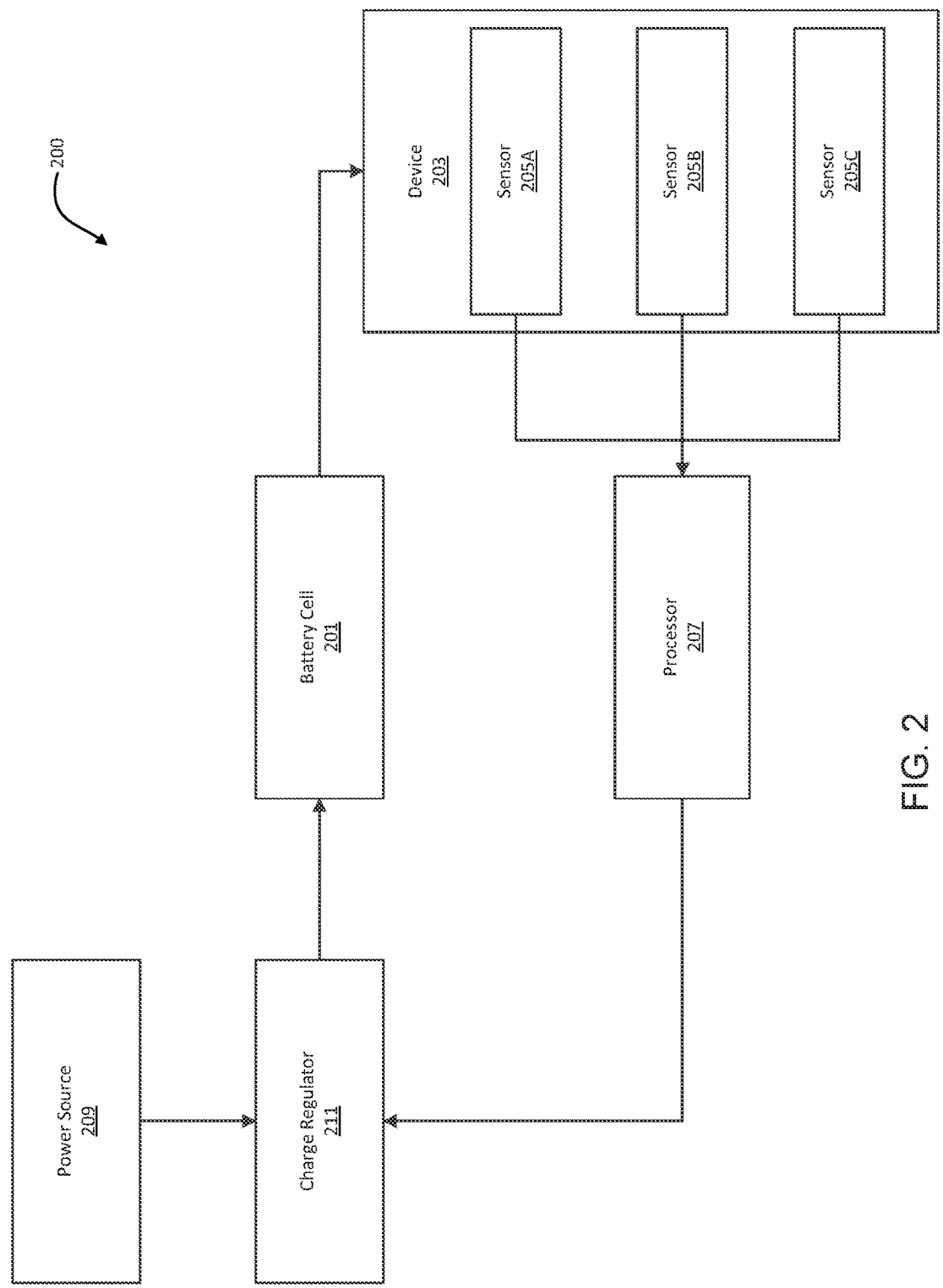
FIG. 2 is another system for terminating the charging of a battery cell at a charge termination value that is calculated by accounting for environmental conditions according to another embodiment.

FIG. 2 illustrates a system 200 for terminating the charging of a battery cell 201 at a charge termination value that is calculated by accounting for environmental conditions, similar to the system 100 shown in FIG. 1. The system 200 comprises the battery cell 201 that is electrically coupled to a device 203. The device 203 comprises sensors 205A, 205B, 205C to gather data pertaining to one or more environmental conditions including temperature, sunlight intensity, weather forecast, humidity, night length, pressure, and precipitation. Thus, the battery cell 201 may deliver electricity to the sensors 205A, 205B, 205C. The data gathered by the sensors 205A, 205B, 205C is delivered to a processor 207 that receives the environmental data and processes the environmental data to calculate a charge termination value. The charge termination value can be calculated using any of the methods and formulae disclosed herein. The processor 207 may send a command to a charge regulator 211 to prevent or reduce charging of the battery cell 201 when the charge termination value has been reached in the battery cell 201. Charging of the battery cell 201 is performed by a power source 209 providing electricity to the battery cell 201. Unless described contradictorily in this paragraph, elements of FIG. 2 may be embodied as any of the embodiments of the corresponding elements of FIG. 1 as described above.

Figure 3:
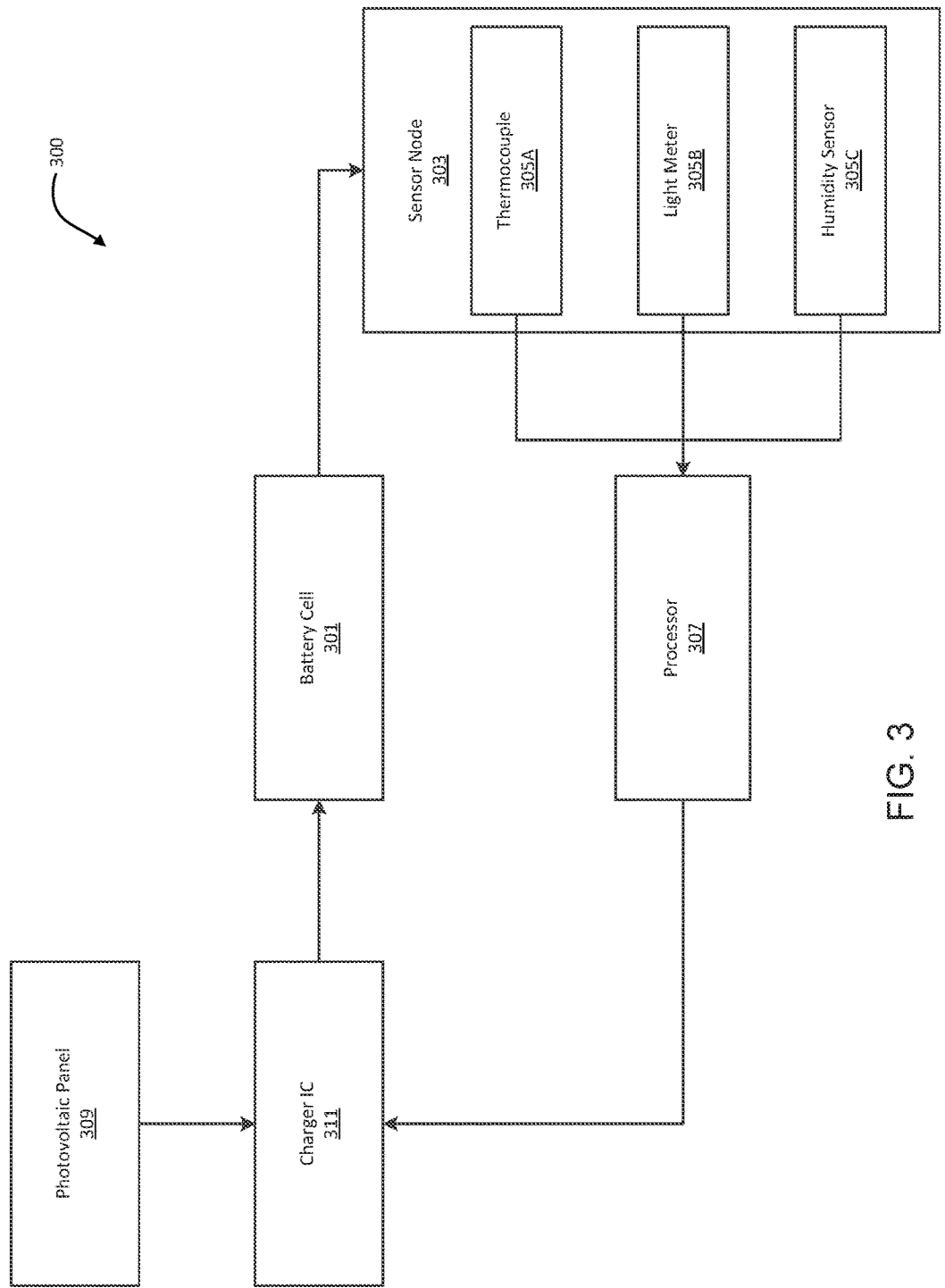
FIG. 3 is another system for terminating the charging of a battery cell at a charge termination value that is calculated by accounting for environmental conditions according to another embodiment.

FIG. 3 illustrates a system 300 for terminating the charging of a battery cell 301 at a charge termination value that is calculated by accounting for environmental conditions, similar to the system 200 shown in FIG. 2, wherein the battery cell 301 powers a sensor node 303. In the illustrated embodiment, the battery cell 301 is electrically coupled to the sensor node 303 to provide electricity for powering the sensor node 303. In the illustrated embodiment, the sensor node 303 comprises a thermocouple 305A, a light meter 305B, and a humidity sensor 305C for gathering data pertaining to environmental conditions. However, in other embodiments, the sensor node 303 may comprise one or more of any of these sensors, or other sensors that measure environmental conditions.

The environmental data is accessed by a processor 307 and processed to calculate a charge termination value. The processor 307 may communicate the charge termination value to a charger IC 311 (charger integrated circuit). In some embodiments, the processor 307 communicates electronic code that is executable by the charger IC 311, the electronic code comprising the charge termination value and instruction to prevent or reduce charging of the battery cell 301 when the charge level of the battery cell 301 meets or exceeds the charge termination value. In other embodiments, after the processor 307 calculates the charge termination value, the charge termination value is stored in a data store and the charger IC 311 comprises executable code for accessing the charge termination value from the data store. In these embodiments, the charger IC 311 may execute electronic code that prevents or reduces the charging of the battery cell 301. In some embodiments, the charger IC 311 comprises one or more logic gates to perform one or more of preventing, reducing, and fully allowing charging of the battery cell 301.

In the illustrated embodiment, a photovoltaic panel 309 is electrically coupled to the battery cell 301 to provide electricity to the battery cell 301 when not inhibited by the charger IC 311.

FIG. 3 illustrates a specialized embodiment of a system for terminating the charging of a battery cell at a charge termination value that is calculated by accounting for environmental conditions by applying the system to a type of electronic device that benefits from extending a battery's life. Sensor nodes, or "motes," may be small, self-powered systems that harvest energy from the ambient environment and perform simple sensing functions, perform processing, and communicate the data to a host. Some sensor nodes may be located in environments that are difficult to access, and they are expected to require very little or no maintenance. Some sensor nodes have one or more energy harvesting elements that harvest energy and store the energy in a battery to power the sensor node. In some instances, sensor nodes are expected to function for several years without maintenance; however, many sensor nodes are equipped with a battery whose lifetime is limited to two years or fewer because of battery degradation. Therefore, the system 300 that extends the lifetime of a battery is particularly beneficial in use with a sensor node.

It is understood that any combination of the elements described above are within the scope of this disclosure. Furthermore, elements may be removed from any of the embodiments described above and still be within the scope of this disclosure.

Figure 4:
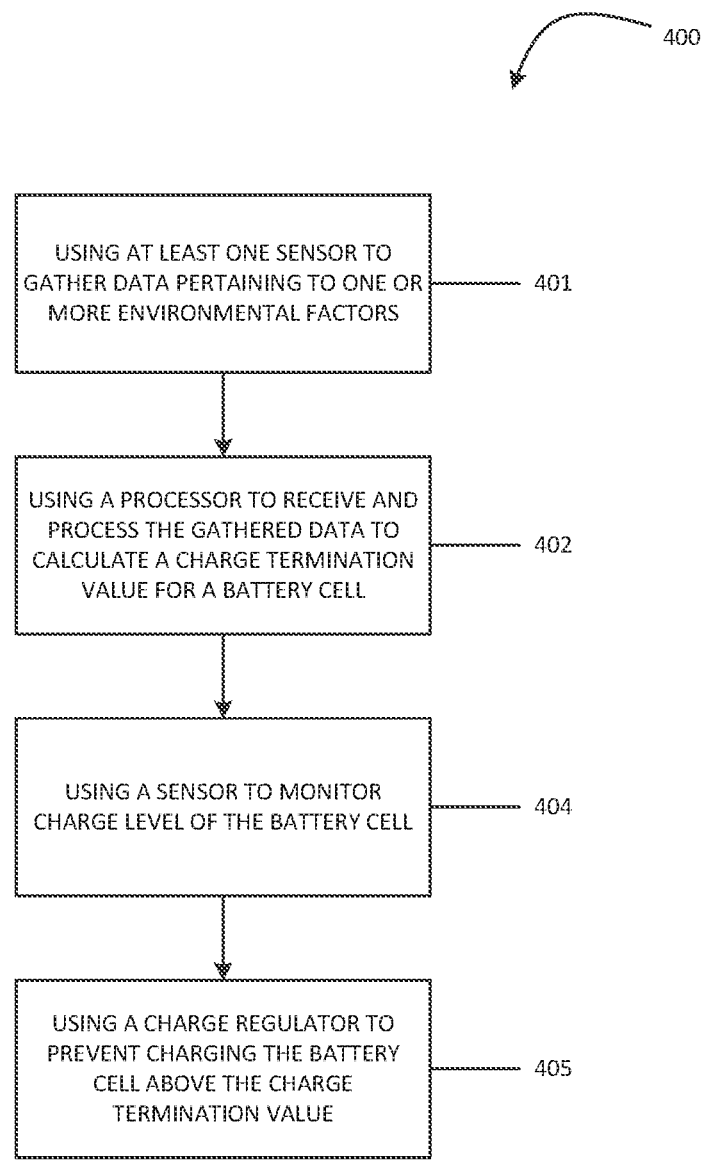
FIG. 4 illustrates a flow chart of a method for terminating the charging of a battery cell at a charge termination value that is calculated by accounting for environmental conditions according to one embodiment.

FIG. 4 illustrates a flow chart of a method 400 for terminating the charging of a battery cell at a charge termination value that is calculated by accounting for environmental conditions. The method 400 comprises using 401 at least one sensor to gather data pertaining to one or more environmental factors, using 402 a processor to receive and process the gathered data and to calculate a charge termination value for a battery, using 404 a sensor to monitor charge level of the battery cell, and using 405 a charge regulator to prevent charging the battery cell above the charge termination value. Method 400 may be completed using one or more system elements, and interactions of the system elements, described herein.

Figure 5:
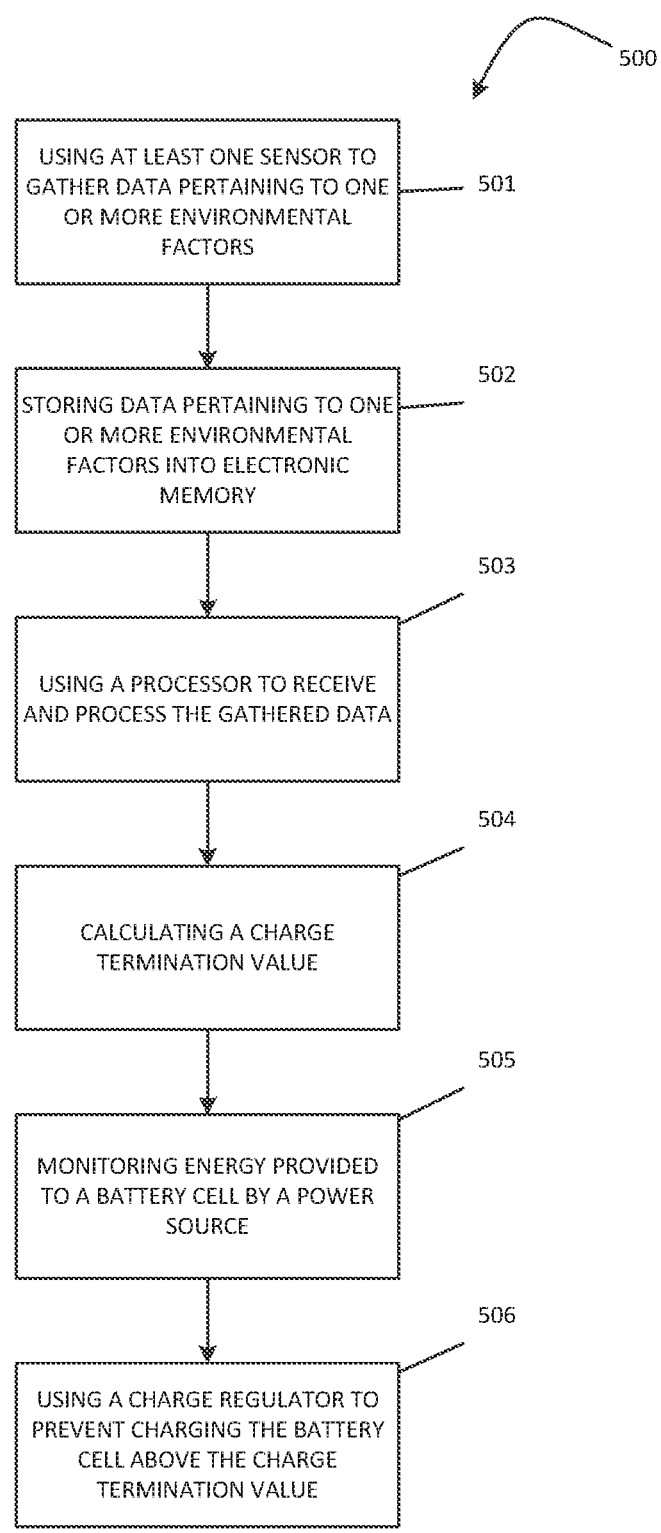
FIG. 5 illustrates a flow chart of a method for terminating the charging of a battery cell at a charge termination value that is calculated by accounting for environmental conditions according to another embodiment.

FIG. 5 illustrates a flow chart of a method 500 for terminating the charging of a battery cell at a charge termination value that is calculated by accounting for environmental conditions. The method 500 comprises using 501 at least one sensor to gather data pertaining to one or more environmental factors, storing 502 data pertaining to one or more environmental factors in electronic memory, using 503 a processor to receive and process the gathered data, calculating 504 a charge termination value, monitoring 505 energy provided to a battery cell by a power source, and using 506 a charge regulator to prevent charging the battery cell above the charge termination value. Method 500 may be complete using one or more of system elements, and interactions the system elements, described herein.

Figure 6:
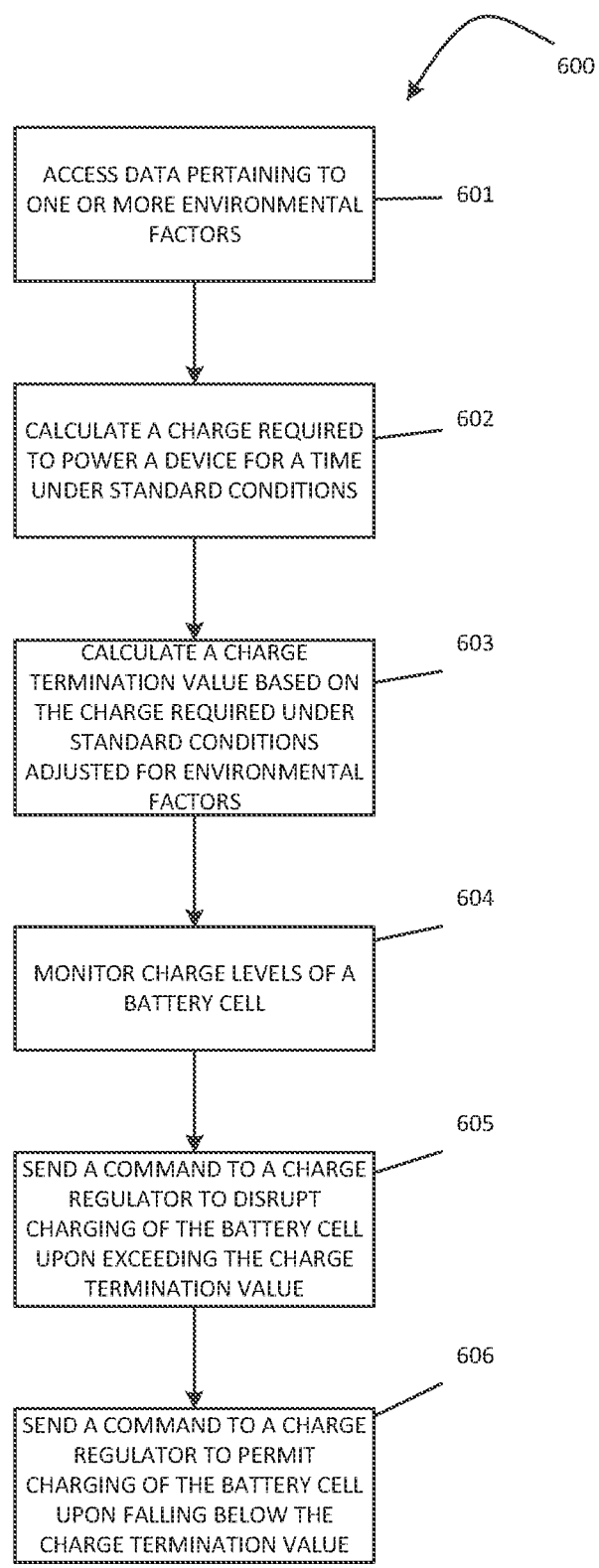
FIG. 6 illustrates a flow chart of a method for terminating the charging of a battery cell at a charge termination value that is calculated by accounting for environmental conditions according to another embodiment.

FIG. 6 illustrates a flow chart of a method 600 for terminating the charging of a battery cell at a charge termination value that is calculated by accounting for environmental conditions. Method 600 comprises access 601 data pertaining to one or more environmental factors, calculate 602 a charge required to power a device for a time under standard conditions, calculate 603 a charge termination value based on the charge required under standard conditions adjusted for environmental conditions, monitor 604 charge levels of a battery cell, send 605 a command to a charge regulator to disrupt charging of the battery cell upon exceeding the charge termination value, and send 606 a command to a charge regulator to permit charging of the battery cell upon falling below the charge termination value. Method 600 may be complete using one or more of system elements, and interactions the system elements, described herein. In particular, method 600 may be performed by one or more processors.

Example Embodiments

The following are examples of further embodiments. Examples may include subject matter such as a battery, a device, a method, a means for performing acts of the method, or at least one machine-readable medium including instructions that, when performed by a machine cause the machine to perform acts of the method according to the embodiments and examples described herein.

Example 1 is a battery system. The battery system includes a battery cell, at least one sensor, a processor, a power source, and a charge regulator. The battery cell stores energy to power a device. The sensor gathers data pertaining to one or more environmental conditions. The processor receives and processes the data pertaining to one or more environmental conditions, which calculates a charge termination value for the battery cell. The charge termination value is an amount of charge to power the device for a duration of time at least until a predicted recharge begins. The power source provides energy to the battery cell, and the charge regulator limits the amount of energy stored by the battery cell to the charge termination value.

Example 2 includes the battery system of Example 1, where the device comprises a sensor node.

Example 3 includes the battery system of any of Examples 1-2, where the charge termination value is calculated by making adjustments based on environmental conditions to a maximum necessary charge value. The maximum necessary charge value is the amount of charge used by the device during the longest predicted duration of time between recharges.

Example 4 includes the battery system of any of Examples 1-2, where the charge termination value is calculated by making adjustments based at least on environmental conditions to a maximum necessary charge value. The maximum necessary charge value is the amount of charge used by the device during the longest measured duration of time between recharges.

Example 5 includes the battery system of any of Examples 1-4, where the battery cell contains a lithium-ion battery.

Example 6 includes the battery system of any of Examples 1-5, where at least one sensor contains one or more photovoltaic cell, a solar cell, a thermocouple, and a wireless communication device.

Example 7 includes the battery system of any of Examples 1-6, where at least one sensor gathers data pertaining to environmental conditions from a data source detached from the sensor.

Example 8 includes the battery system of any of Examples 1-7, where the environmental conditions contain one or more temperature, sunlight intensity, weather forecast, humidity, and night length.

Example 9 includes the battery system of any of Examples 1-8, where the charge termination value is calculated daily.

Example 10 includes the battery system of any of Examples 1-9, where the charge termination value is calculated as one or more of a percentage of a total charge capacity of the battery cell and voltage equivalent to a percentage.

Example 11 includes the battery system of any of Examples 1-10, where the charge termination value accounts for the degradation of the battery cell.

Example 12 includes the battery system of any of Examples 1-11, where the charge termination value is calculated as a percentage of battery charge capacity using the equation: $H_n/H_0 \times Y \times 1/Z \times 100\%$. $H_n$ is the number of hours in the predicted duration of time between recharges following the current day at the power supply's location. $H_0$ is the number of hours in the longest predicted duration of time between recharges. Y is a coefficient based on environmental conditions such that Y is greater than 1 when environmental conditions cause one or more of additional energy consumption by the device than under ideal environmental conditions and decreased energy provided to the battery cell by the power supply. Z is a coefficient based on battery cell degradation such that when the battery cell has decreased in charge capacity from degradation, Z represents the fraction of a current battery cell charge capacity divided by an original battery cell charge capacity.

Example 13 includes the battery system of any of Examples 1-12, which also contains a coulomb counter to measure the total amount of charge added to the battery cell during recharge or lost during discharge.

Example 14 includes the battery system of Example 13, where the charge termination value is calculated as a total amount of electric charge contained in the battery cell.

Example 15 includes the battery system of any of Examples 1-14, where the power supply involves a photovoltaic cell.

Example 16 includes the battery system of any of Examples 1-15, and contains a computer chip designed to execute computer executable code for delivering a command to the charge regulator to disrupt energy flow from the power supply to the battery cell once the charge termination value is stored in the battery cell.

Example 17 includes the battery system of Example 16, where the charge regulator contains a logic gate.

Example 18 includes the battery system of any of Examples 1-17, where the charge termination value includes a reserve charge. The reserve charge is an amount of charge in excess of the least amount of charge necessary to power the device for a duration of time until a predicted recharge begins.

Example 19 is a method for charging a battery cell. The battery cell derives a charge termination value by (1) using at least one sensor to measure one or more environmental conditions; (2) using a processor to receive and process data from at least one sensor to calculate the charge termination value for the battery cell; and (3) providing a charge to the battery cell. The charge termination value contains at least the amount of charge necessary, accounting for the one or more environmental conditions, to power a device for a duration of time until a predicted recharge begins. The battery cell uses a power supply to provide energy to the battery cell and a charge regulator to prevent energy from being provided to the battery cell when the charge of the battery cell exceeds the charge termination value.

Example 20 includes the method of Example 19, where the regulator permits energy to be provided to the battery cell when a charge level of the battery cell is less than the charge termination value.

Example 21 includes the method of any of Examples 19-20, where the regulator permits the power supply to provide sufficient energy to the battery cell to maintain a charge level of the battery cell within 10 percent of the charge termination value.

Example 22 includes the method of any of Example 19-21, where the battery cell provides electricity to power at least one sensor.

Example 23 is an electronic device. The electronic device includes at least one sensor to collect environmental data of an environment; a first data store for storing environmental data; a second data store for keeping battery performance history; a processor for accessing the data store and processing the environmental data to derive a charge termination value; a battery cell for storing energy; a power supply for providing energy to the battery cell; and a charge regulator for limiting an amount of power provided by the power supply. The charge termination value contains at least an amount of charge necessary to power the electronic device for a period of time beginning at a predicted termination of a first recharging period and ending at a predicted beginning of a second recharging period. The power supply provides energy to the battery cell, where an amount of power provided by the power supply varies based upon a current state of the environment; and the charge regulator limits an amount of power provided by the power supply to prevent the battery cell from storing more energy than the charge termination value.

Example 24 includes the electronic device of Example 23, where the first data store and the second data store are contained in one computer component.

Example 25 includes the electronic device of any of Examples 23-24, where the derivation of the charge termination value occurs during the first recharging period.

Example 26 includes the electronic device of any of Examples 23-25, where the electronic device contains a sensor node.

Example 27 includes the electronic device of any of Example 23-26, where the charge termination value is calculated by making adjustments based at least on environmental conditions to a maximum necessary charge value. The maximum necessary charge value is the amount of charge to be used by the device during the longest predicted duration of time between recharges.

Example 28 includes the electronic device of any of Examples 23-26, where the charge termination value is calculated by making adjustments based at least on environmental conditions to a maximum necessary charge value. The maximum necessary charge value is the amount of charge to be used by the device during the longest measured duration of time between recharges.

Example 29 includes the electronic device of any of Examples 23-28, where the battery cell involves a lithium-ion battery.

Example 30 includes the electronic device of any of Examples 23-29, where at least one sensor contain one or more photovoltaic cell, a solar cell, a thermocouple, and a wireless communication device.

Example 31 includes the electronic device of any of Examples 23-30, where at least one sensor gathers data pertaining to environmental conditions from a data source detached from the sensor.

Example 32 includes the electronic device of any of Examples 23-31, where the environmental conditions include one or more temperature, sunlight intensity, weather forecast, humidity, and night length.

Example 33 includes the electronic device of any of Examples 23-32, where the charge termination value is calculated daily.

Example 34 includes the electronic device of any of Examples 23-33, where the charge termination value is calculated as one or more of a percentage of a total charge capacity of the battery cell and voltage equivalent to a percentage.

Example 35 includes the electronic device of any of Examples 23-34, where the charge termination value accounts for the degradation of the battery cell.

Example 36 includes the electronic device of any of Examples 23-35, where the charge termination value is calculated as a percentage of battery charge capacity using the equation: $H_n/H_0 \times Y \times 1/Z \times 100\%$. $H_n$ is the number of hours in the predicted duration of time between recharges following the current day at the power supply's location. $H_0$ is the number of hours in the longest predicted duration of time between recharges. Y is a coefficient based on environmental conditions such that Y is greater than 1 when environmental conditions cause one or more of additional energy consumption by the device than under ideal environmental conditions and decreased energy provided to the battery cell by the power supply. Z is a coefficient based on battery cell degradation such that when the battery cell has decreased in charge capacity from degradation, Z represents the fraction of a current battery cell charge capacity divided by an original battery cell charge capacity.

Example 37 includes the electronic device of any of Examples 23-36, which also contains a coulomb counter to measure the total amount of charge added to the battery cell during recharge or lost during discharge.

Example 38 includes the electronic device of any of Examples 23-37, where the charge termination value is calculated as a total amount of electric charge contained in the battery cell.

Example 39 includes the electronic device of any of Examples 23-38, where the power supply contains a photovoltaic cell.

Example 40 includes the electronic device of any of Examples 23-39, and also includes a computer chip designed to execute computer executable code for delivering a command to the charge regulator to disrupt energy flow from the power supply to the battery cell once the charge termination value is stored in the battery cell.

Example 41 includes the electronic device of Example 40, where the charge regulator comprises a logic gate.

Example 42 includes the electronic device of any of Examples 23-41, where the charge termination value includes a reserve charge. The reserve charge is an amount of charge in excess of the least amount of charge necessary to power the device for a duration of time until a predicted recharge begins.

Example 43 includes the method of Example 19, where a first data store stores environmental data and a second data store stores battery performance history.

Example 44 includes the method of Example 19, where calculating the charge termination value occurs during a first recharging period.

Example 45 includes the method of Example 19, where at least one sensor is included in a sensor node.

Example 46 includes the method of Example 19, where the charge termination value is calculated by making adjustments based on environmental conditions to a maximum necessary charge value. The maximum necessary charge value is the amount of charge to be used by the device during the longest predicted duration of time between recharges.

Example 47 includes the method of Example 19, where the charge termination value is calculated by making adjustments based on environmental conditions to a maximum necessary charge value. The maximum necessary charge value is the amount of charge to be used by the device during the longest measured duration of time between recharges.

Example 48 includes the method of Example 19, where the battery cell contains a lithium-ion battery.

Example 49 includes the method of Example 19, where at least one sensor contains a photovoltaic cell, a solar cell, a thermocouple, and a wireless communication device.

Example 50 includes the method of Example 19, where one or more sensors gather data pertaining to environmental conditions from a data source apart from the sensor.

Example 51 includes the method of Example 19, where one or more environmental conditions contain one or more temperature, sunlight intensity, weather forecast, humidity, and night length.

Example 52 includes the method of Example 19, where the charge termination value is calculated daily.

Example 53 includes the method of Example 19, where the charge termination value is calculated as one or more of a percentage of a total charge capacity of the battery cell and voltage equivalent to a percentage.

Example 54 includes the method of Example 19, where the charge termination value accounts for degradation of the battery cell.

Example 55 includes the method of Example 19, where the charge termination value is calculated as a percentage of battery charge capacity using the equation: $H_n/H_0 \times Y \times 1/Z \times 100\%$. $H_n$ is the number of hours in the predicted duration of time between recharges following the current day at the power supply's location. $H_0$ is the number of hours in the longest predicted duration of time between recharges. Y is a coefficient based on environmental conditions such that Y is greater than 1 when environmental conditions cause one or more of additional energy consumption by the device than under ideal environmental conditions and decreased energy provided to the battery cell by the power supply. Z is a coefficient based on battery cell degradation such that when the battery cell has decreased in charge capacity from degradation, Z represents the fraction of a current battery cell charge capacity divided by an original battery cell charge capacity.

Example 56 includes the method of Example 19, which further includes a coulomb counter to measure the total amount of charge added to the battery cell during recharge or lost during discharge.

Example 57 includes the method of Example 19, where the charge termination value is calculated as a total amount of electric charge contained in the battery cell.

Example 58 includes method of Example 19, where the power supply comprises a photovoltaic cell.

Example 59 includes the method of Example 19, further delivering a command to the charge regulator to disrupt energy flow from the power supply to the battery cell once the charge termination value is stored in the battery cell.

Example 60 includes a machine-readable storage with machine-readable instructions that, when executed, implements a method as shown in any of Examples 19-21 or 43-59.

Example 61 includes a means for implementing a method as shown in any of Examples 19-21 or 43-59.

Example 62 includes a method for charging a battery cell. The method also includes deriving a charge termination value by measuring one or more environmental conditions; receives and processes a measurement of one or more environmental conditions to calculate the charge termination value for the battery cell; provides a charge to the battery cell, which prevents energy from being provided to the battery cell when the charge of the battery cell exceeds the charge termination value. The charge termination value contains at least the amount of charge necessary, accounting for the one or more environmental conditions, to power a device for a duration of time until a predicted recharge begins.

Example 63 includes a means for implementing a method as shown in Example 62.

Example 64 includes a machine-readable storage containing machine-readable instructions that, when executed, implements a method as shown in Example 62.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. A machine-readable medium may include, for example, static random access memory (RAM), dynamic RAM, flash memory, one or more flip-flops, read only memory (ROM), compact disc ROM (CD-ROM), digital versatile disk (DVD), magnetic disk, magnetic tape, or other magnetic, optical, or solid state computer storage medium.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art. The scope of the present invention should, therefore, be determined only by the following claims.

The invention claimed is:

1. A battery system, comprising:
a battery cell for storing energy to power a device;
at least one sensor to gather data pertaining to one or more environmental conditions;
a processor to receive and process the data pertaining to one or more environmental conditions to calculate a charge termination value for the battery cell, wherein the charge termination value comprises at least an amount of charge estimated to power the device for a period of time beginning at a predicted termination of a first recharging period and ending at a predicted beginning of a second recharging period;
a power source to provide energy to the battery cell; and
a charge regulator to limit an amount of energy stored by the battery cell to the charge termination value.

2. The battery system of claim 1, wherein the device comprises a sensor node.

3. The battery system of claim 1, wherein the charge termination value is calculated by making adjustments based at least on environmental conditions to a maximum necessary charge value, the maximum necessary charge value being the amount of charge to be used by the device during a longest predicted duration of time between recharges.

4. The battery system of claim 1, wherein the charge termination value is calculated by making adjustments based at least on environmental conditions to a maximum necessary charge value, the maximum necessary charge value being the amount of charge to be used by the device during a longest measured duration of time between recharges.

5. The battery system of claim 1, wherein the battery cell comprises a lithium-ion battery.

6. The battery system of claim 1, wherein the at least one sensor comprises one or more of a photovoltaic cell, a solar cell, a thermocouple, and a wireless communication device.

7. The battery system of claim 1, wherein one or more of the at least one sensor gathers data pertaining to environmental conditions from a data source distant from the sensor.

8. The battery system of claim 1, wherein the environmental conditions comprise one or more of temperature, sunlight intensity, weather forecast, humidity, and night length.

9. The battery system of claim 1, wherein the charge termination value is calculated daily.

10. The battery system of claim 1, wherein the charge termination value is calculated as one or more of a percentage of a total charge capacity of the battery cell and voltage equivalent to a percentage.

11. The battery system of claim 10, wherein the charge termination value accounts for the degradation of the battery cell.

12. The battery system of claim 10 wherein the charge termination value is calculated as a percentage of battery charge capacity using the equation: $H_n/H_0 \times Y \times 1/Z \times 100\%$,
wherein $H_n$ is the number of hours in the predicted duration of time between recharges following the current day at the power supply's location,
wherein $H_0$ is the number of hours in the longest predicted duration of time between recharges,
wherein Y is a coefficient based on environmental conditions such that Y is greater than 1 when environmental conditions cause one or more of additional energy consumption by the device than under ideal environmental conditions and decreased energy provided to the battery cell by the power supply, and
wherein Z is a coefficient based on battery cell degradation such that when the battery cell has decreased in charge capacity from degradation, Z represents the fraction of a current battery cell charge capacity divided by an original battery cell charge capacity.

13. The battery system of claim 1, further comprising a coulomb counter to measure the total amount of charge added to the battery cell during recharge or lost during discharge.

14. The battery system of claim 13, wherein the charge termination value is calculated as a total amount of electric charge contained in the battery cell.

15. The battery system of claim 1, wherein the power supply comprises a photovoltaic cell.

16. The battery system of claim 1, further comprising a computer chip configured to execute computer executable code for delivering a command to the charge regulator to disrupt energy flow from the power supply to the battery cell once the charge termination value is stored in the battery cell.

17. The battery system of claim 16, wherein the charge regulator comprises a logic gate.

18. The battery system of claim 1, wherein the charge termination value includes a reserve charge, the reserve charge being an amount of charge in excess of the least amount of charge necessary to power the device for a duration of time until a predicted recharge begins.

19. A method for charging a battery cell comprising:
deriving a charge termination value comprising:
using at least one sensor to measure one or more environmental conditions; and
using a processor to receive and process data from the at least one sensor to calculate the charge termination value for the battery cell, wherein the charge termination value comprises at least an amount of charge estimated, accounting for the one or more environmental conditions, to power the device for a period of time beginning at a predicted termination of a first recharging period and ending at a predicted beginning of a second recharging period; and
providing charge to the battery cell comprising:
using a power supply to provide energy to the battery cell; and using a charge regulator to prevent energy from being provided to the battery cell when the charge of the battery cell exceeds the charge termination value.

20. The method of claim 19, wherein the regulator permits energy to be provided to the battery cell when a charge level of the battery cell is less than the charge termination value.

21. The method of claim 19, wherein the regulator permits the power supply to provide sufficient energy to the battery cell to maintain a charge level of the battery cell within 10 percent of the charge termination value.

22. The method of claim 19, wherein the battery cell provides electricity to power at least one sensor.

23. An electronic device comprising:
- at least one sensor to collect environmental data of an environment;
- a first data store for storing environmental data;
- a second data store for keeping battery performance history;
- a processor for accessing the data store and processing the environmental data to derive a charge termination value, wherein the charge termination value comprises at least an amount of charge necessary to power the electronic device for a period of time beginning at a predicted termination of a first recharging period and ending at a predicted beginning of a second recharging period;
- a battery cell for storing energy;
- a power supply for providing energy to the battery cell, wherein an amount of power provided by the power supply varies based upon a current state of the environment; and
- a charge regulator for limiting an amount of power provided by the power supply to prevent the battery cell from storing more energy than the charge termination value.

24. The electronic device of claim 23, wherein the first data store and the second data store are comprised in one computer component.

25. The electronic device of claim 23, wherein the derivation of the charge termination value occurs during the first recharging period.

* * * * *